No. 692,868. Patented Feb. 11, 1902.
H. LEMP.
STEERING MECHANISM FOR AUTOMOBILE VEHICLES.
(Application filed July 15, 1898.)
(No Model.) 3 Sheets—Sheet 1.
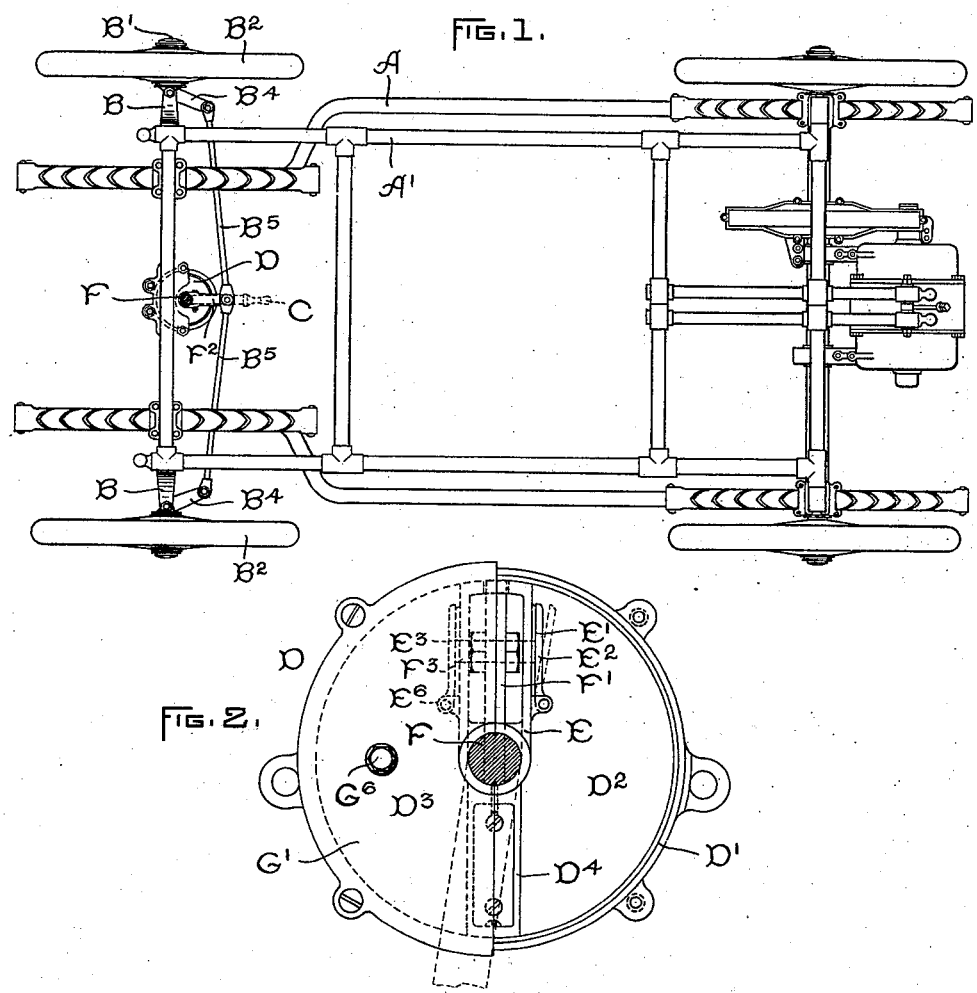
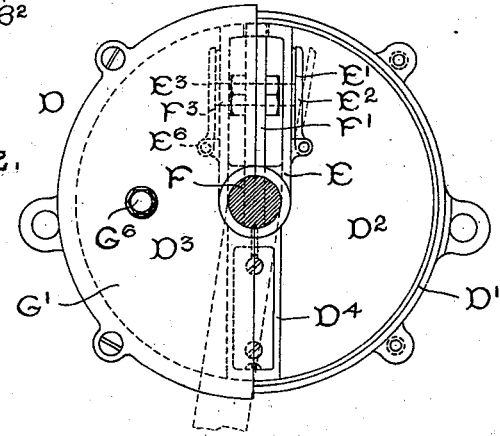
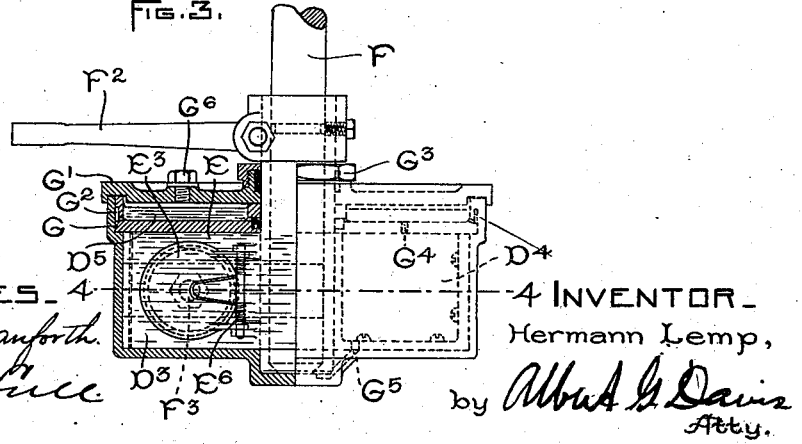
WITNESSES  
Raymond H. Danforth  
B. B. Hull
INVENTOR  
Hermann Lemp,  
by Albert G. Davis  
Atty.

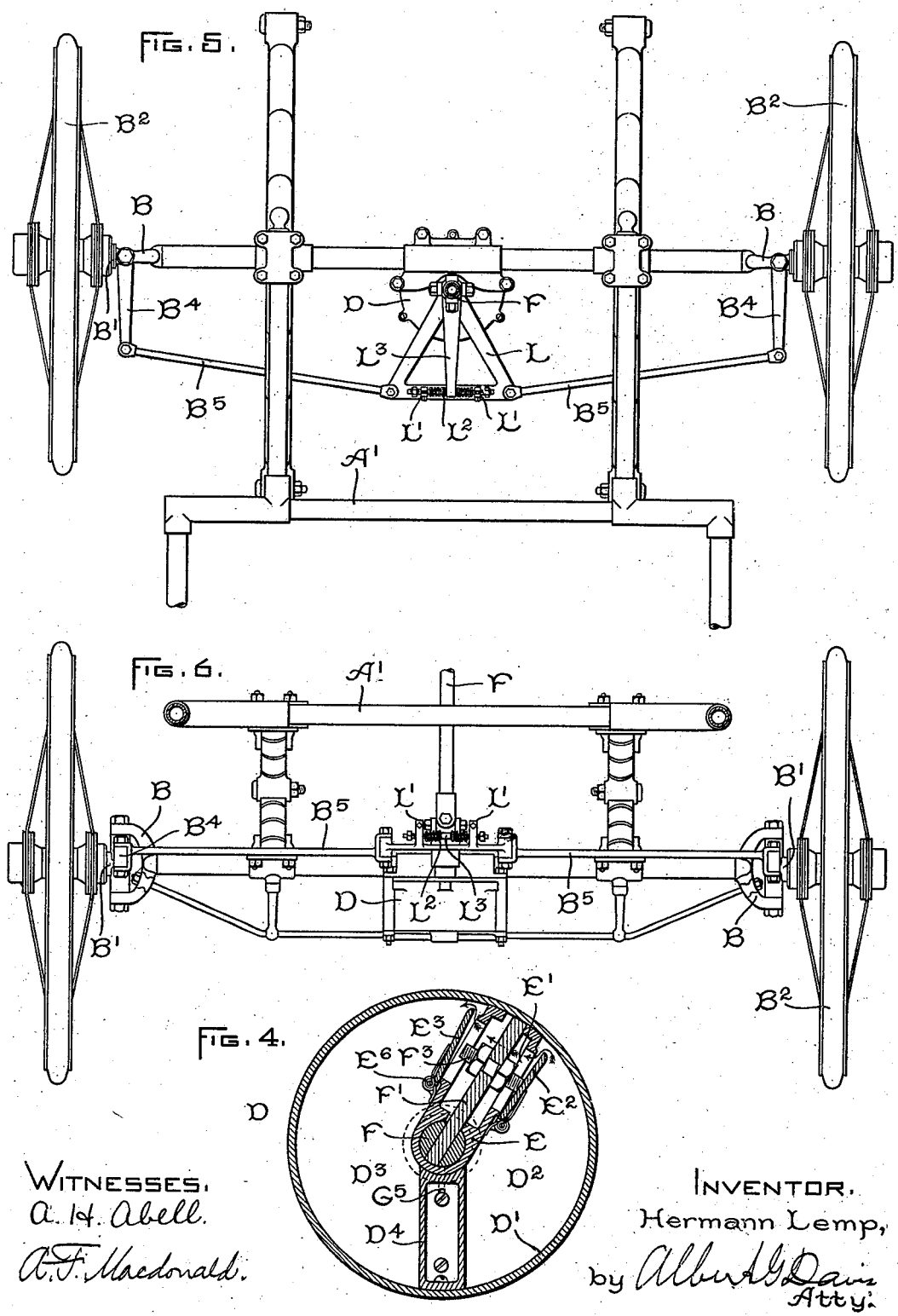

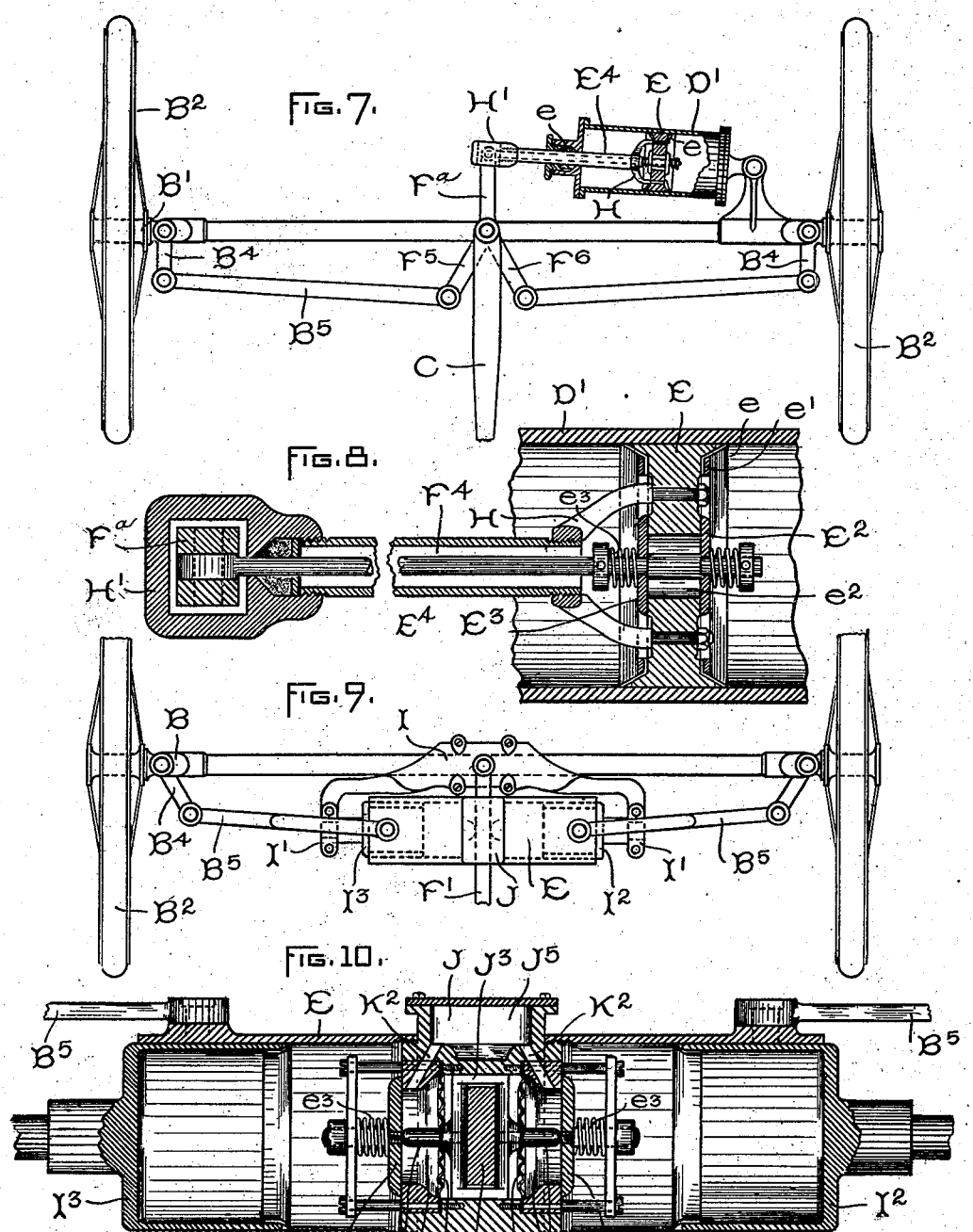

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

STEERING MECHANISM FOR AUTOMOBILE VEHICLES.

SPECIFICATION forming part of Letters Patent No. 692,868, dated February 11, 1902.

Application filed July 15, 1898. Serial No. 686,063. (No model.)

*To all whom it may concern:*

Be it known that I, HERMANN LEMP, a citizen of the United States, residing at Lynn, in the county of Essex, State of Massachusetts, have invented certain new and useful Improvements in Automobile Vehicles, (Case No. 663,) of which the following is a specification.

The successful operation of automobile vehicles is largely dependent upon the steering device, and up to the present time it has probably been the cause of more accidents than any other feature.

My invention has for its objects, first, to provide a simple steering mechanism so arranged that the strains to which the wheels are subjected shall not be transferred to the operating-handle; second, that the vehicle-wheels shall be locked in position as soon as the pressure is removed from the actuating-handle; third, that the steering mechanism shall be so arranged that the course of the vehicle can be quickly changed—as, for example, to avoid an obstruction or to turn a corner, and, fourth, that the angular position of the handle shall indicate relatively the angular movement of the wheels.

My invention also relates to certain details of construction more fully described and claimed hereinafter.

In the accompanying drawings, which show an embodiment of my invention, Figure 1 is a plan view of a vehicle-frame and steering mechanism. Fig. 2 is a plan view of the hydraulic lock for the steering mechanism with a part of the cover removed. Fig. 3 is a side elevation, partially in section, of the same. Fig. 4 is a section on line 4 4 of Fig. 3. Fig. 5 is a plan view of the mechanism employed to return the steering-handle to a position where it will permit the valves to close and lock the wheels. Fig. 6 is an end elevation of the same. Fig. 7 is a slight modification of the hydraulic lock in which the piston has a reciprocating movement instead of a rotary, as in the first instance. Fig. 8 is an enlarged view of the piston shown in Fig. 7. Fig. 9 is a plan view of a further modification in which diaphragms are employed to control the action of the locking-valves. Fig. 10 is an enlarged sectional detail of the above.

I prefer to use the well-known "double-axle" construction for steering, which comprises a long front axle rigidly secured to the vehicle-frame and carrying at its extremities two short axles to which the wheels are fastened, the two wheels being coupled together and to the steering-handle by suitable connecting-rods.

Referring to Figs. 1, 5, and 6, A represents the vehicle-frame to which the axles are rigidly connected, and A' the rectangular spring-supported frame which carries the body of the vehicle. The ends of the front axle are provided with forks B, and in these forks are mounted short axles B' for the wheels B². Formed integral with the short axles B' are levers B⁴, which are connected to each other and to the operating or steering handle C by the rods B⁵. As is the usual practice, the levers B⁴ and the connecting-rods B⁵ are so arranged that the two wheels are capable of being turned to positions where they make an angle with each other. This is done so that the wheel nearer the center of the circle around which the carriage moves may turn at a sharper angle than the one outside, the object being to have all the axes converge upon the center of the circle around which the vehicle turns.

It is of the utmost importance that the wheels of the vehicle shall be controlled easily by the handle C and that the strains to which the wheels are subjected due to rough ground or obstructions shall not be transmitted to the handle. In other words, the wheels ought to be perfectly locked in any position where they are left by the operator and the strains on the wheels taken up by a locking device, which is free to be unlocked at any moment at the will of the operator. I am aware that various means have been employed to obtain such a result, such as using a worm-gearing interposed between the steering-handle and the wheels, based upon the well-known principle that a worm-wheel may be easily turned by the worm, but the worm cannot readily be turned by the wheel. The drawback to such an arrangement, however, is that the multiplication being so great, even for slight movements of the carriage, the worm-wheel has to be given a large number of revolutions, involving a great deal of work on the part of the operator and depriving him of rapidity of motion at times when it is really required. If the pitch of the worm-wheel and the worm is reduced so as to bring the multiplication down to one to two, for instance, the freedom of the steering-handle from wheel strains will be sacrificed, so that the only result will be increased leverage upon the moving mechanism, without, however, releasing the operator from the real strains encountered. I am also aware that other means have been employed, such as complete locks on a quadrant or a heavy frictional resistance upon the steering-rod, which may be released at times when the steering is desired. The objections to these plans, however, are that at times when the operator has to use his judgment rapidly he may forget to unlock the lever, or he may be unable to relieve the resistance, and thus produce an accident. The object of the device, to be described hereinafter, is to interpose between the steering-wheels and the controlling-lever an absolute lock which will be released by the motion of the steering-handle itself and in the direction in which it is desired to move it, and not by using any outside device requiring thought or separate means for putting it into operation. All the operator needs is to know how to steer, and the locking and unlocking is taken care of automatically without his knowledge.

Referring to the locking mechanism D, (shown in Figs. 1 to 6, inclusive,) the outer cup-shaped case D is bolted to the fixed axle or some portion of the framework. The space within the casing is divided by the stationary wall D' and the rotary piston E into two fluid-containing chambers $D^2$ and $D^3$. The piston is sleeved upon the operating-shaft F, and is provided with a central opening to receive the actuator F', which is rigidly secured to the operating-shaft, and also for the purpose of permitting the fluid under certain conditions, to pass from one chamber to another. I have found glycerin to be a very satisfactory fluid with which to fill the chambers $D^2$ and $D^3$ on account of its non-freezing property, but oil or water may be substituted therefor. The sides of the rotary piston are provided with openings E', and these openings are controlled by the spring-pressed valves $E^2$ $E^3$. These valves are pivotally secured at one side and under normal conditions are retained in their closed position by the spiral springs $E^6$. Rigidly secured to the piston-sleeve which surrounds the operating-shaft F is a lever $F^2$, which lever is connected at its outer end to the wheels $B^2$ through the rods $B^5$. It is obvious that for successful operation of the locking device no air should be allowed to enter the compression-chambers, and to accomplish this and to keep the chambers $D^2$ and $D^3$ filled with glycerin or other fluid a chamber $D^5$ is provided, which is formed between the top plate G and the cover G'. This chamber is filled with the same kind of fluid which fills the chambers $D^2$ and $D^3$, and to prevent the fluid from working outward a packing-ring $G^2$ is placed between the cover and the casing and a stuffing-box $G^3$ around the shaft F. The chamber $D^5$ communicates with the opening in the fixed partition $D^4$ by means of the hole $G^4$, and the said opening communicates with the chambers $D^2$ and $D^3$ through the passage $G^5$ and the chamber in the piston. If the joints are not perfect and oil is forced from either chamber $D^2$ or $D^3$ during the time when any strain is taking place, the oil forced out will enter chamber $D^5$ and later on flow back to its original place. When for any reason the amount of fluid has been decreased, the chambers can be refilled by removing the plug $G^6$ and pouring fluid in at the opening thus formed. This is a very convenient arrangement, as it does not necessitate removing the lock from the vehicle. Between the piston E and the actuator F' is a slight amount of lost motion, as shown in Fig. 4. This is arranged so as to cause the cross-bolt $F^3$ on the actuator to open either valve $E^2$ or $E^3$, depending on which way it is moved. This releases the piston so that the steering mechanism may readily be moved. Assuming that the actuator F' is moved to a position where it will open valve $E^2$, the fluid from chamber $D^2$ will pass through the opening E' into the chamber in the piston E and thence through the opening covered by valve $E^3$ into chamber $D^3$. So long as the valve is open and the movement of the piston continued in the same direction the fluid will continue to flow; but as soon as the pressure on the operating-handle ceases both valves will close, due to the springs $E^6$, and the steering mechanism will be locked in position.

The parts are so arranged that the angular position of the handle C indicates relatively the angle which the vehicle will travel. Assuming that the handle C is pushed to the right, the first part of its travel—as a half-inch, for example—will be occupied in releasing the valve $E^3$, after which the actuator F' will engage with the piston and through it and the lever $F^2$, which is rigidly connected thereto, move the wheels $B^2$ by means of the rods $B^5$. The instant the pressure is removed from the handle the springs $E^6$ will cause the valves $E^3$ and $E^2$ to close and the wheels to be locked in position.

The check shown in Figs. 5 and 6 contains a slight modification over the one shown in the previous figures. In the check shown in Figs. 1 to 4, inclusive, the small springs $E^6$ were depended upon to close the valves and also to bring the actuator F' to an inoperative position. In other words, the springs $E^6$ closed the valves $E^2$ and $E^3$ and held the actuator out of operation. I have found when the springs $E^6$ are stiff enough to accomplish this that when one valve is opened by the cross-bolt the other valve does not readily open and permit the fluid to flow from one chamber to the other. This tends to create a vacuum in the chamber controlled by the closed valve, and the fluid which is forced out of the chamber controlled by the open valve passes upward through the hole $G^4$ in the case. In order to overcome this objection, a triangular frame L, with springs for centralizing the arm $L^3$, is provided, which frame is rigidly secured at one of its apexes to the sleeve-like hub or extension of the piston E. The remaining apexes are connected to rods $B^5$, which in turn are connected to the wheels. The arm $L^3$ is rigidly connected to the steering-shaft F and to the handle C. Mounted in lugs $L'$ are spring-pressed buffers $L^2$, which tend to hold the arm $L^3$ and the valve-actuator $F'$ in their midway position. When the shaft F is rotated either side of its central position, it compresses one or the other of the buffer-springs, at the same time opening either valve $E^2$ or $E^3$, depending upon which way it is rotated. After one of the valves has been opened the wheels may be turned by means of the rods $B^5$; but as soon as the actuator is relieved from pressure the springs $L^2$ will bring the valve-actuator $F'$ and the arm $L^3$ to a central position and permit the springs $E^6$ to close the valves and lock the wheels. This arrangement forms a desirable feature, since it permits of the use of light springs for closing the valves and strong springs for centering or rendering the arm $L^3$ and the actuator $F'$ inoperative, whereby the action of the lock is made more certain and at the same time more sensitive. It will be seen that with the structure of Figs. 5 and 6 the steering strains are taken care of by the arm $L^3$ and the triangular frame L instead of by the actuator $F'$, as in Figs. 1 to 4. This arrangement permits of the use of strong and substantial parts and ones not liable to be injured. If during the act of steering the wheels meet with an obstacle which is greater than the operator is able to overcome by the operating-handle, the pressure of the wheels on the steering mechanism will cause the valves to shut, and the strain will be taken by the lock, the wheels meanwhile being rigidly locked in place. In other words, as the cylinder tends to move with respect to the piston the fluid in the compression-chamber, aided by the springs $E^6$, closes the valve and prevents the passage of fluid from one chamber to another. With this arrangement it is impossible for the wheels to be wrenched out of the control of the operator.

The importance of a perfect locking mechanism cannot be overestimated in a vehicle of the character described, and where the vehicle is to be used in a city having car-tracks and cobble-stones it becomes a matter of absolute necessity. By arranging the lock-releasing mechanism so that it requires no mental effort on the part of the operator or a movement other than the customary one to steer the vehicle, instead of a lock controlled by a separate handle, one source of danger is removed—namely, that of the operator becoming confused when it is necessary to make a quick turn to avoid a collision and forgetting to actuate the separate handle which controls the locking mechanism.

In Figs. 7 and 8 I have shown a slight modification of my hydraulic lock which operates in a similar manner, but is cheaper to construct than the one previously described. Pivotally supported on the front stationary axle is a cylinder $D'$, and mounted for reciprocating movement within the cylinder is a piston E, which is connected to the operating-handle C through a lost-motion connection. The piston E is attached to the tube $E^4$ by a fork H, and at the outer end of the tube is a head $H'$, which loosely surrounds the lever $F^a$. The piston E is provided with packing-rings $e$, which are secured in place by the metal rings $e'$. Mounted within the tube is a rod $F^4$, which is pivotally connected to the lever $F^a$ at one end and to the oppositely-acting valves $E^2$ and $E^3$ at the other. Extending through the center of the piston is an opening $e^2$, which is normally closed at its ends by the spring-pressed valves $E^2$ and $E^3$. Between the head $H'$ and the lever $F^a$ is a slight amount of lost motion, so that at the start the lever will move a short distance before it affects the tube $E^4$ and piston E. This causes the proper valve to open and permit the fluid on one side of the piston to pass through the opening $e^2$ in the piston to the other side. Assuming that the right-hand valve is opened, the fluid will flow from the right-hand side of the cylinder through the opening $e^2$, raising the valve $E^3$ against the action of the spiral compression-spring $e^3$. As soon as this is done the piston may be moved toward the right as long as the valve $E^2$ remains open; but as soon as this valve shuts valve $E^3$ will shut also and the piston will be locked between two fluid bodies. The wheels $B^2$ are supported on short axles, as described in connection with Fig. 1, except that the levers $B^4$ extend parallel to the wheels instead of at an angle, and two levers $F^5$ and $F^6$ are employed instead of one. By changing the length of the lever $F^a$ the effect of the lock upon the wheels can be varied as desired.

In Figs. 9 and 10 I have shown a modification of the hydraulic lock in which the cylinder E is arranged to move while the pistons are held stationary. Mounted upon the stationary front axle is a casting I, having arms $I'$, in which are mounted the pistons $I^2$ and $I^3$. Surrounding the pistons is the cylinder E, and connecting the opposite ends of the cylinder with the wheels are rods $B^5$. Pivotally supported in the casting I is an actuator $F'$, which is controlled by the main operating-handle. The cylinder E is divided in the center by a casting J, and through this casting passes the actuator $F'$. Mounted within this casting are two diaphragms $J'$ and $J^2$, which are connected by a rectangular block $J^3$. Secured to each diaphragm on the side away from the actuator is a pin $J^4$, which is so arranged that as soon as the diaphragm is deflected it will raise one of the spring-pressed valves from the valve-seat. In the upper part of the casting is formed a fluid-chamber $J^5$, which communicates with the chambers K and K' by means of the passages $K^2$. Situated on opposite sides of the actuator are spring-pressed oppositely-actuated valves $E^2$ and $E^3$. These valves are normally retained in the position shown by means of the compression-springs $e^3$. Assuming that it is desired to move the wheels so that they point toward the left, the actuator is moved so that it will deflect the diaphragm $J^2$ and cause the pin $J^4$ to lift the valve $E^3$. This will permit the fluid to pass from the right-hand side of the piston through the chamber K, passages $K^2$, and chamber $J^5$ into the chamber K' into the left-hand side of the cylinder, and at the same time the cylinder E may be pushed bodily to the right, causing the wheels to be deflected to the left. As the cylinder moves toward the right the effect is to push the piston $I^2$ inward and to withdraw the piston $I^3$. This causes the fluid in the right-hand chamber to pass into the left-hand chamber and check any sudden movement of the wheels.

My invention has been shown in connection with a vehicle which is propelled by an electric motor; but it is evident that it may be applied to vehicles which are propelled by other sources of energy.

What I claim as new, and desire to secure by Letters Patent of the United States, is—

1. In a locking mechanism for two elements which are movable with respect to each other, the combination of a divided receptacle, a passive fluid which fills the receptacle, an operator mechanism connected to one of the elements, and means for transferring more or less of the fluid from one part of the receptacle to the other, the amount of fluid thus transferred being in proportion to the movement of the operator.

2. In a locking mechanism, the combination of a fixed and a moving element, a receptacle, a passive fluid which fills the receptacle, a means capable of dividing the receptacle into compartments which are alike or unlike in size depending upon its position, and a handle which is connected to the said means, the relation of parts being such that the movement of the handle regulates the amount of fluid transferred from one compartment to another.

3. In a steering-check for vehicles, the combination of a steering-wheel, a handle mechanically connected thereto, a receptacle containing a body of passive fluid, means connected to the handle which divides the receptacle into compartments, and positively transfers the fluid from one compartment to another during the act of steering, and means for checking this transfer of fluid when for any reason the transfer tends to take place faster than is permitted by the handle, as would be the case when the steering-wheel struck a road obstruction.

4. In a steering mechanism for vehicles, the combination of an axle, a hydraulic locking device for the axle, a handle for steering the vehicle and controlling the operation of the hydraulic lock under normal conditions, and means for rendering the locking automatic when undue pressure is applied to the axle.

5. In a steering mechanism for vehicles, the combination of an axle, a locking mechanism comprising a piston and cylinder, a valve controlling the operation of the locking mechanism, and means connected to the axle for moving it, and for controlling the operation of the valve.

6. In a steering mechanism for vehicles, the combination of an axle, a locking mechanism comprising a piston and cylinder, a pair of valves controlling the action of the piston, a handle mechanically connected to the axle for steering the vehicle and controlling the operation of the valves, and a lost-motion connection between the handle and the valves, whereby the latter may close when the axle is subjected to sudden strains.

7. In a steering mechanism for vehicles, the combination of an axle, a locking mechanism comprising a piston and cylinder, oppositely-acting valves controlling the action of the locking mechanism, and a handle for steering the vehicle and controlling the operation of the valves, the relation between the handle and the locking and steering mechanism being such that one of the valves is released each time the handle is moved from a position of rest.

8. In a steering mechanism for vehicles, the combination of an axle, a locking mechanism comprising a piston and cylinder, a pair of oppositely-acting valves mounted on the piston, a handle for moving the axle, and a connection between the handle and the axle, having a certain amount of lost motion.

9. In an automobile vehicle, the combination of a steering wheel or wheels, a hydraulic locking mechanism for holding the wheel or wheels and preventing the transmission of wheel strains to the steering device, and a manual steering device which is mechanically connected to the steering-wheels and is so arranged that a movement in either direction from the position which it last occupied will first release the lock and then move the steering wheel or wheels.

10. In a steering mechanism, the combination of a steering device, a divided receptacle forming a part of a hydraulic locking mechanism, a passive fluid which fills the receptacle, a handle mechanically connected with the steering device, and means actuated by the handle for positively transferring or setting in motion the fluid within the receptacle.

11. In a hydraulic lock for vehicle-wheels, the combination of a cylinder which is attached to the vehicle-frame, a piston connected to the vehicle-wheels, fluid-chambers on each side of the piston, a valve in the piston for regulating its action, a reservoir containing fluid, and a passage connecting the reservoir with one of the chambers.

12. In a hydraulic lock for vehicle-wheels, the combination of a cylinder which is attached to the vehicle-frame, an operating-shaft, a piston sleeved on the shaft and connected by suitable means with the vehicle-wheels, fluid-chambers on each side of the piston, valves on the piston, and an actuator on the operating-shaft for opening the valves.

13. In an automobile vehicle, the combination of a pair of steering-wheels, a cylinder, a body of normally quiescent fluid contained therein, a rotary piston mounted for movement therein, means for releasing the piston, a steering-handle for moving the piston, and a lost-motion connection between the piston and the steering-handle.

14. In an automobile vehicle, the combination of a locking mechanism for the wheels, comprising a fixed cylinder which is mounted on the vehicle-frame, and a rotary piston, fluid-chambers formed in the cylinder by the piston and a fixed partition, valves controlling the passage of fluid between the chambers, a shaft for moving the wheels, an actuator mounted on the shaft, which is so arranged that it first opens one of the valves, and then moves the wheels, and a reservoir for maintaining a body of fluid in the chambers.

15. In a vehicle, the combination of a double-axle suspension for the steering-wheels, an operating-handle for manually changing the position of the wheels, a vertically-extending shaft connecting said handle to the steering-wheels, and a piston and cylinder constituting a dash-pot, whereby the transmission of wheel strains to the operating-handle is prevented.

16. In a device for checking movement between two elements or members which are movable with respect to each other, the combination of a cylinder, a piston, an actuator, a normally quiescent body of fluid, and a valve which is normally opened and closed by the actuator, but which is automatically closed when a sudden movement is imparted to one of the said members.

17. In combination, two elements which are movable with respect to each other, an actuator, a hydraulic locking mechanism between the elements which, under ordinary operating conditions, is controlled by the actuator, and means for rendering the operation of the locking mechanism automatic when, for any reason, the elements tend to move with respect to each other without the assistance of the actuator.

18. In a device for checking sudden movements between two movable members, the combination of an actuator, a locking mechanism consisting of a cylinder filled with fluid, a piston working therein, a valve for controlling the fluid within the cylinder, which is opened by the actuator when it is desired to move the members with respect to each other, but which is automatically closed when one member tends to move with respect to the other without the aid of the actuator.

19. In a steering mechanism, the combination of a handle which is connected to a steering-wheel and is capable of assuming a number of positions with respect to the normal or starting position, and a hydraulic lock for the steering-wheel which is operative in each of said positions of the handle and is normally controlled thereby, and means for rendering the locking automatic whenever the wheel strikes an obstruction and tends to transmit wheel strains to the steering-handle.

20. In a steering mechanism for vehicles, the combination of a steering-wheel, a manually-operated handle secured thereto, and so arranged that its angular position indicates relatively the direction of travel, a hydraulic lock composed of a body of fluid which takes no part in the act of moving the wheel, but which holds the steering-wheel in any position to which it may have been moved by the steering-handle, and releasing mechanism for the lock which is controlled by the handle.

21. In a steering mechanism, the combination of a frame-bar or fixed axle, a cylinder secured thereto, a piston mounted in the cylinder, a shaft secured to the piston, a frame sleeved on the shaft, which is mechanically coupled to the steering apparatus, and a spring connection between the shaft and the steering apparatus.

22. In a checking mechanism, the combination of a cylinder, a piston, a fixed partition therein, the partition and piston acting to divide the cylinder into two chambers, oppositely-acting valves mounted on the piston and covering the opening therein, and means for opening the valves.

23. In a checking mechanism, the combination of a cylinder, a piston sleeved on a shaft and mounted for movement within the cylinder, which piston is provided with a central opening, an actuator for the piston mounted within the opening therein, a valve covering the opening in the piston, and means connected with the piston-actuator for actuating the valve.

24. In combination, two elements which are mounted in such manner that they have a limited movement with respect to each other, a hydraulic lock between the two elements, composed of a body of fluid which takes no part in the act of moving either of the elements, and valves for controlling the lock that operate automatically irrespective of the position which the elements occupy with respect to each other.

25. In a steering mechanism, the combination of a steering device, means for moving said device, a compression-spring connected between the steering device and said means, and a hydraulic lock for controlling the action of the parts, which is released when the spring is compressed.

26. In a self-propelled vehicle, the combination of steering-wheels having a double-axle suspension, rods connecting the axles, a frame to which the rods are secured, an actuator for moving the frame, springs between the rods and the actuator, and means for locking the wheels as soon as the actuator is relieved from pressure.

27. In a locking or checking device, the combination of a cylinder, a rotary piston mounted therein, a fixed partition in the cylinder; the piston and partition uniting to divide the cylinder into two chambers, a fluid body in said chamber, and a third chamber which acts as a reservoir and is situated above the other and in connection therewith.

28. In an automobile vehicle, the combination of a pair of steering-wheels, a steering-handle connected to the wheels, a cylinder, a rotary piston mounted for movement therein, means for moving the piston, a lost-motion connection between the piston and the steering-handle, and valves for checking the transmission of wheel strains to the steering-handle.

29. The combination in an automobile vehicle of a manually-actuated steering-handle, or its equivalent, under the control of the operator, means connecting said handle with the steering mechanism, and a hydraulic lock composed of a body of fluid which performs no part in the act of moving the steering-wheel, and is normally in its locked position, but unlocked as long as pressure is applied to the handle.

30. The combination in an automobile vehicle, of a manually-actuated steering-handle, or its equivalent, under the control of the operator, means whereby said handle can act to actuate a steering mechanism, and a hydraulic lock normally operative but unlocked as long as pressure is applied to the handle, and means for closing said lock if the steering mechanism tends to be thrown in the wrong direction.

31. The combination of two elements which are movable with respect to each other, a hydraulic lock comprising a piston and a cylinder; a body of fluid surrounding the piston, a body of passive fluid in communication with the first for preventing a decrease in the amount of fluid in the cylinder; and also for preventing the entrance of air, and a detachable partition between the piston and said body of passive fluid.

32. The combination of two elements which are movable with respect to each other, a piston and cylinder constituting a check for the moving elements, a body of passive fluid filling the cylinder on both sides of the piston, a reservoir composed of a top and a removable partition also containing a passive body of fluid which surrounds the working parts of the check in such a manner that it prevents the entrance of air into the cylinder.

33. In a hydraulic lock, the combination of a piston and cylinder, a passive body of fluid located in the cylinder-packing between the moving and stationary parts of the lock, a reservoir located above the joints between the parts of the hydraulic lock, and having a grooved periphery, which groove contains fluid means for closing the reservoir, and a body of passive fluid within the reservoir which prevents the entrance of air to the cylinder.

34. In a steering mechanism for vehicles, the combination of steering-wheels mounted independently, a mechanical connection between the wheels, a single locking device for holding both wheels in any desired position, a steering-handle for moving the wheels, means whereby the movement of the handle in the proper direction for steering releases the locking device, and moves the wheels and a spring and lost-motion connection for causing the locking device to be reset when pressure is removed from the handle.

35. In a vehicle, the combination of a fixed axle, hangers secured to the ends thereof, short axles each carrying a wheel mounted in the hangers, a pair of jointed rods which connect the short axles, a steering-handle which is connected to each rod through a lost-motion connection, and a locking mechanism for preventing wheel strains from being transmitted to the handle, composed of two parts, one of said parts being rigidly connected to the vehicle-frame, while the second part is connected to the steering-handle through said lost-motion connection.

36. In a vehicle, the combination of a fixed axle, hangers secured to the ends thereof, short axles mounted in the hangers, connections between said short axles, a steering-handle operatively connected to the wheels, a locking device composed of two principal parts, one of which is secured to the fixed axle and is concentrically arranged with respect to the center of movement of the steering-shaft, a second part capable of moving around the axis of the shaft as a center and arranged to be locked and unlocked with respect to the first-mentioned part, and means carried by the handle for controlling the locking and unlocking.

37. In a steering apparatus for vehicles, a controlling member having a swinging movement to steer, an axle, wheel-spindles pivoted thereto, an arm set at an angle on each spindle, and connections intermediate the spindle-arms and controlling member, including a double-acting lock, the initial steering movement of said controlling member operating to release said lock thereby permitting continued movement of the controlling member to change the angular position of the wheel-spindles.

38. A steering wheel or wheels, a manually-operated controller to change the position thereof, locking means to maintain the same in a given position, said wheel or wheels being operatively connected with a rotative member of said means, a release device connected with the controller, the latter and the rotative member being also connected but having a limited relative movement to operate the releasing device, and means to thereafter effect movement of the said rotative member by the controller independent of the releasing device.

In witness whereof I have hereunto set my hand this 1st day of July, 1898.

HERMANN LEMP.

Witnesses:
A. F. MACDONALD,
DUGALD MCKILLOP.